US012020860B2

(12) United States Patent
Kang et al.

(10) Patent No.: US 12,020,860 B2
(45) Date of Patent: *Jun. 25, 2024

(54) COIL COMPONENT

(71) Applicant: Samsung Electro-Mechanics Co., Ltd., Suwon-si (KR)

(72) Inventors: Byung Soo Kang, Suwon-si (KR); Byeong Cheol Moon, Suwon-si (KR); Tae Jun Choi, Suwon-si (KR); Ju Hwan Yang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,545

(22) Filed: Feb. 7, 2023

(65) Prior Publication Data

US 2023/0187129 A1 Jun. 15, 2023

Related U.S. Application Data

(63) Continuation of application No. 16/572,853, filed on Sep. 17, 2019, now Pat. No. 11,600,437.

(30) Foreign Application Priority Data

Jan. 9, 2019 (KR) ........................ 10-2019-0002630

(51) Int. Cl.

*H01F 41/00* (2006.01)
*H01F 17/04* (2006.01)
(Continued)

(52) U.S. Cl.

CPC ........... *H01F 41/005* (2013.01); *H01F 17/04* (2013.01); *H01F 27/02* (2013.01); *H01F 27/292* (2013.01);
(Continued)

(58) Field of Classification Search

CPC ........ H01F 41/005; H01F 17/04; H01F 27/02; H01F 27/292; H01F 27/306; H01F 27/327; H01F 41/127; H01F 2017/048
See application file for complete search history.

(56) References Cited

U.S. PATENT DOCUMENTS 6,169,470 B1 * 1/2001 Ibata .................. H01F 17/0006 336/200
2005/0046538 A1 3/2005 Maruyama
(Continued)

FOREIGN PATENT DOCUMENTS

CN 1794380 A 6/2006
JP H11-040438 A 2/1999
(Continued)

OTHER PUBLICATIONS

Korean Office Action dated Oct. 30, 2019 issued in Korean Patent Application No. 10-2019-0002630 (with English Translation).
(Continued)

*Primary Examiner* — Bickey Dhakal
*Assistant Examiner* — Malcolm Barnes
(74) *Attorney, Agent, or Firm* — Morgan, Lewis & Bockius LLP

(57) ABSTRACT

A coil component includes a molded portion having one surface and another surface opposing each other, and a wound coil disposed on the one surface of the molded portion and including an innermost turn, at least one intermediate turn, and an outermost turn disposed outwardly of a central portion of the one surface of the molded portion. A cover portion is disposed to face the one surface of the molded portion and to cover the wound coil, and first and second external electrodes are connected to the wound coil and arranged to be spaced apart from each other on the other surface of the molded portion. A thickness of one region of the cover portion disposed on the innermost turn is thicker
(Continued)

than a thickness of another region of the cover portion disposed on the outermost turn.

19 Claims, 6 Drawing Sheets

(51) Int. Cl.
*H01F 27/02* (2006.01)
*H01F 27/29* (2006.01)
*H01F 27/30* (2006.01)
*H01F 27/32* (2006.01)
*H01F 41/12* (2006.01)

(52) U.S. Cl.
CPC ......... *H01F 27/306* (2013.01); *H01F 27/327* (2013.01); *H01F 41/127* (2013.01); *H01F 2017/048* (2013.01)

(56) References Cited

U.S. PATENT DOCUMENTS

2006/0249810 A1* 11/2006 Lee ..................... H01L 23/5227 257/531
2009/0322458 A1* 12/2009 Lee ..................... H01F 17/0006 335/299
2015/0028988 A1* 1/2015 Yamauchi ........... H01F 27/2804 336/200
2015/0340149 A1* 11/2015 Lee ........................ H05K 1/111 336/200
2018/0308609 A1* 10/2018 Shinohara ............. H01F 27/292
2018/0308629 A1* 10/2018 Shinohara ............... H01F 27/24
2019/0013145 A1* 1/2019 Ohkubo .................. H01F 17/04
2019/0304669 A1 10/2019 Hirama et al.

FOREIGN PATENT DOCUMENTS

| | | | | |
|---|---|---|---|---|
| JP | 2002-280230 | A | | 9/2002 |
| JP | 3381573 | B2 | | 3/2003 |
| JP | 2009-010137 | A | | 1/2009 |
| JP | 2009010137 | A | * | 1/2009 |
| JP | 2010-016337 | A | | 1/2010 |
| JP | 4802807 | B2 | | 10/2011 |
| JP | 3213692 | U | | 11/2017 |
| JP | 2018-182205 | A | | 11/2018 |
| KR | 20-2011-0003747 | U | | 4/2011 |

OTHER PUBLICATIONS

Japanese Office Action dated Jul. 21, 2020 issued in Japanese Patent Application No. 2019-16857 4 (with English Translation).
Chinese Office Action dated Nov. 15, 2022, issued in corresponding Chinese Patent Application No. 201911256273.1 (with English translation).

* cited by examiner

COIL COMPONENT

CROSS-REFERENCE TO RELATED APPLICATION(S)

This application is the continuation application of U.S. patent application Ser. No. 16/572,853 filed on Sep. 17, 2019, which claims benefit of priority to Korean Patent Application No. 10-2019-0002630 filed on Jan. 9, 2019 in the Korean Intellectual Property Office, the disclosure of which is incorporated herein by reference in its entirety.

BACKGROUND

1. Field

The present disclosure relates to a coil component.

2. Description of Related Art

A magnetic mold and a wound coil may be sometimes used to manufacture a coil component.

With respect to a low-profile of a coil component, a magnetic mold may be related to securing physical strength or hardness of the entirety of the coil component, and thus, the thickness of the cover portion disposed on the upper portion of the coil is becoming thinner.

In this case, a thickness asymmetry phenomenon between the magnetic mold disposed on the lower portion of the coil and the cover portion disposed on the upper portion of the coil can be inevitably worsened. Also, magnetic flux with respect to the cover portion may concentrate on the central portion of the cover portion. As the cover portion becomes thinner, a necking phenomenon of magnetic flux may occur, and characteristics of components such as series inductance (Ls), DC-BIAS, or the like, may be deteriorated.

SUMMARY

An aspect of the present disclosure is to provide a coil component capable of being thinned and capable of maintaining characteristics of the components.

According to an aspect of the present disclosure, a coil component includes a molded portion having one surface and another surface opposing each other, and a wound coil disposed on the one surface of the molded portion and including an innermost turn, at least one intermediate turn, and an outermost turn disposed outwardly of a central portion of the one surface of the molded portion. A cover portion is disposed to face the one surface of the molded portion and to cover the wound coil, and first and second external electrodes are connected to the wound coil and arranged to be spaced apart from each other on the other surface of the molded portion. A thickness of one region of the cover portion disposed on the innermost turn is greater than a thickness of another region of the cover portion disposed on the outermost turn.

According to another aspect of the present disclosure, a coil component includes a body having a support portion having one surface and another surface opposing each other, and a cover portion disposed to face the one surface of the support portion, and a wound coil disposed on the one surface of the support portion to be embedded in the body between the support portion and the cover portion, and wound around a central portion of the body to include an innermost turn, at least one intermediate turn, and an outermost turn. A thickness of one region of the cover portion disposed on the innermost turn is thicker than a thickness of another region of the cover portion disposed on the outermost turn, and a distance between the one surface of the support portion and the other surface of the support portion is greater than the thickness of the one region of the cover portion.

According to a further aspect of the present disclosure, a coil component includes a wound coil having a plurality of coil turns including an innermost turn, at least one intermediate turn extending around the innermost turn, and an outermost turn extending around the innermost turn and the at least one intermediate turn, and a body having the wound coil embedded therein and including a support portion and a cover portion disposed on opposing sides of the wound coil and each having an inner surface facing each other and the wound coil and an outer surface opposing the inner surface. A thickness of the cover portion, between the inner and outer surfaces of the cover portion, decreases stepwise from one region disposed on the innermost turn to another region disposed on the outermost turn.

According to another aspect of the present disclosure, a coil component includes a wound coil having a plurality of coil turns including an innermost turn, at least one intermediate turn extending around the innermost turn, and an outermost turn extending around the innermost turn and the at least one intermediate turn. The innermost turn, the at least one intermediate turn, and the outermost turn each have cross-sectional areas equal to each other and widths different from each other.

According to a further aspect of the present disclosure, a coil component includes a wound coil having a plurality of coil turns including an innermost turn, at least one intermediate turn extending around the innermost turn, and an outermost turn extending around the innermost turn and the at least one intermediate turn. The at least one intermediate turn is disposed radially outward from the innermost turn, and the outermost turn is disposed radially outward from the innermost turn and the at least one intermediate turn. The innermost turn, the at least one intermediate turn, and the outermost turn are offset relative to each other such that only a portion of the outermost turn overlaps with the at least one intermediate turn in the radial direction, and only a portion of the at least one intermediate turn overlaps with the innermost turn in the radial direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
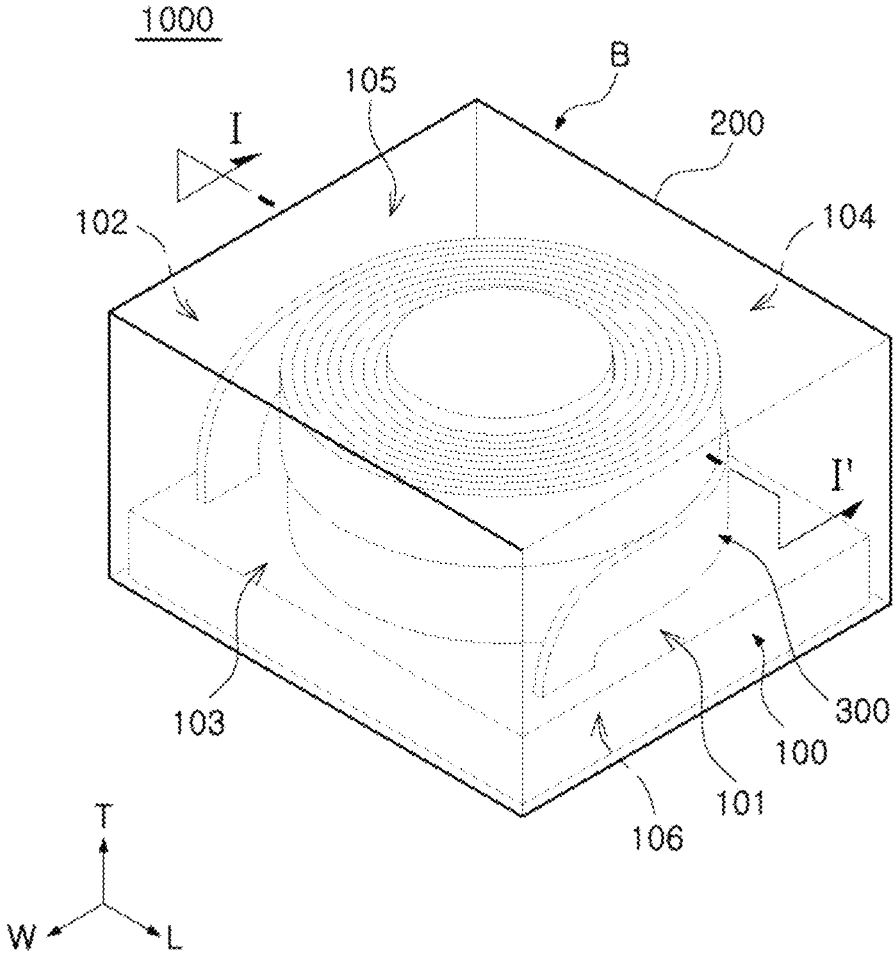
FIG. 1 is a schematic view illustrating a coil component according to a first embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a gravity direction.

The term "coupled to," "combined to," and the like, may not only indicate that elements are directly and physically in contact with each other, but also include configurations in which another element is interposed between the elements such that the elements are also in contact with the other component.

Sizes and thicknesses of elements illustrated in the drawings are indicated as examples for ease of description, and the present disclosure are not limited thereto.

In the drawings, an L direction is a first direction or a length (longitudinal) direction, a W direction is a second direction or a width direction, and a T direction is a third direction or a thickness direction.

Hereinafter, a coil component according to an embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (e.g., GHz) bead, a common mode filter, and the like.

First Embodiment

Figure 2:
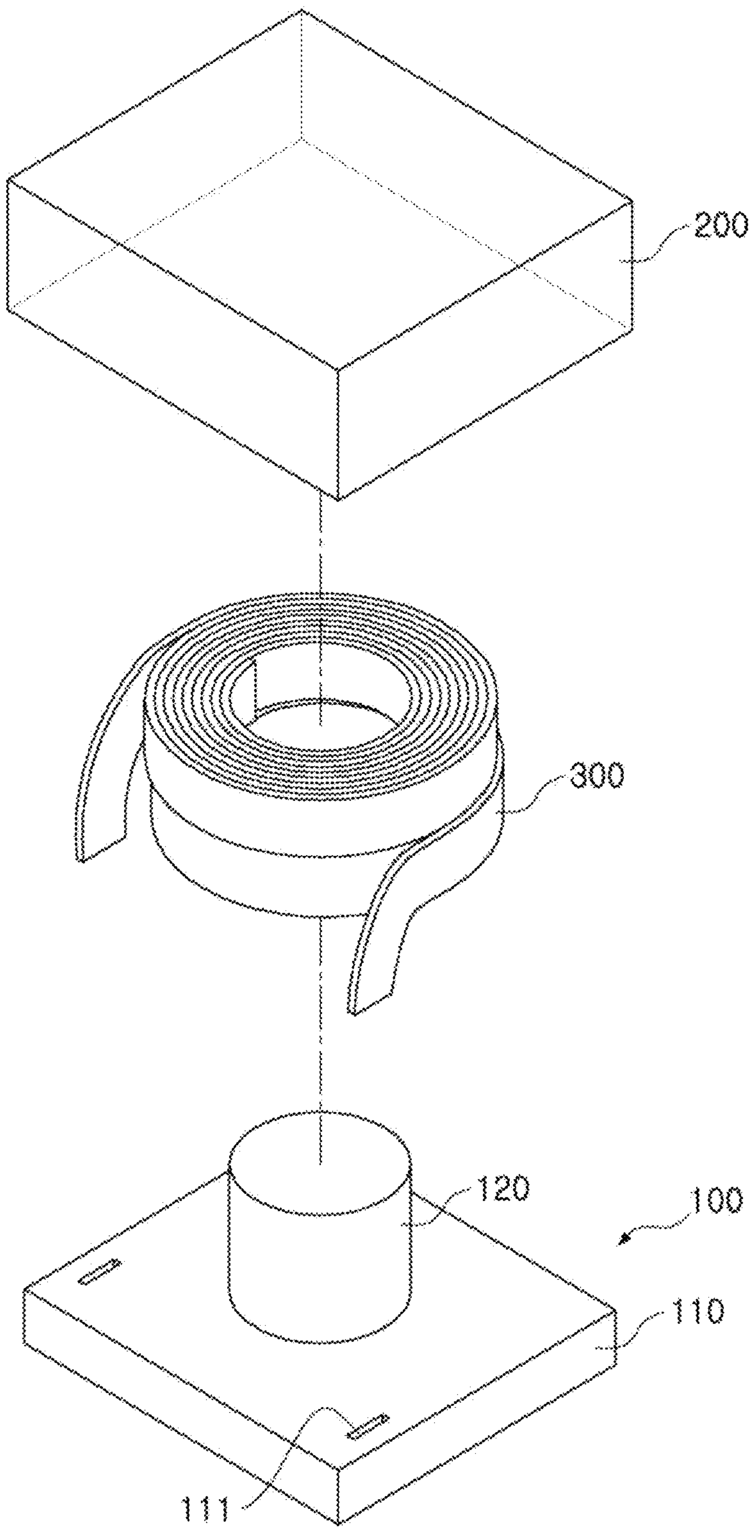
FIG. 2 is an exploded perspective view of the coil component of FIG. 1.
Figure 3:
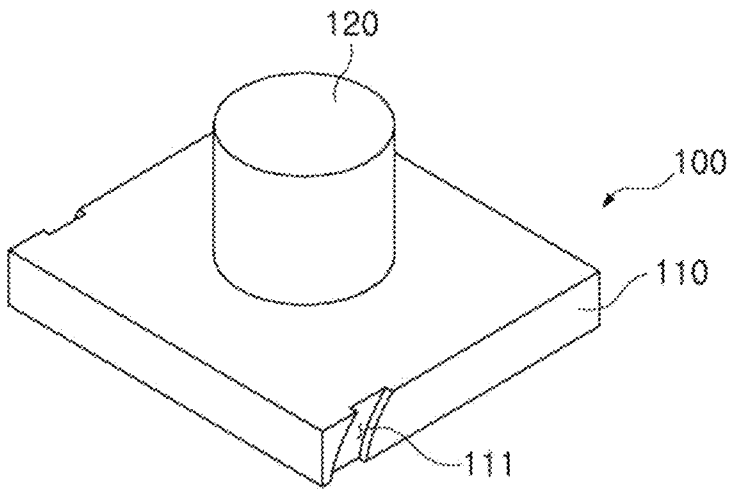
FIG. 3 is a schematic view illustrating a modified embodiment of a molded portion.
Figure 4:
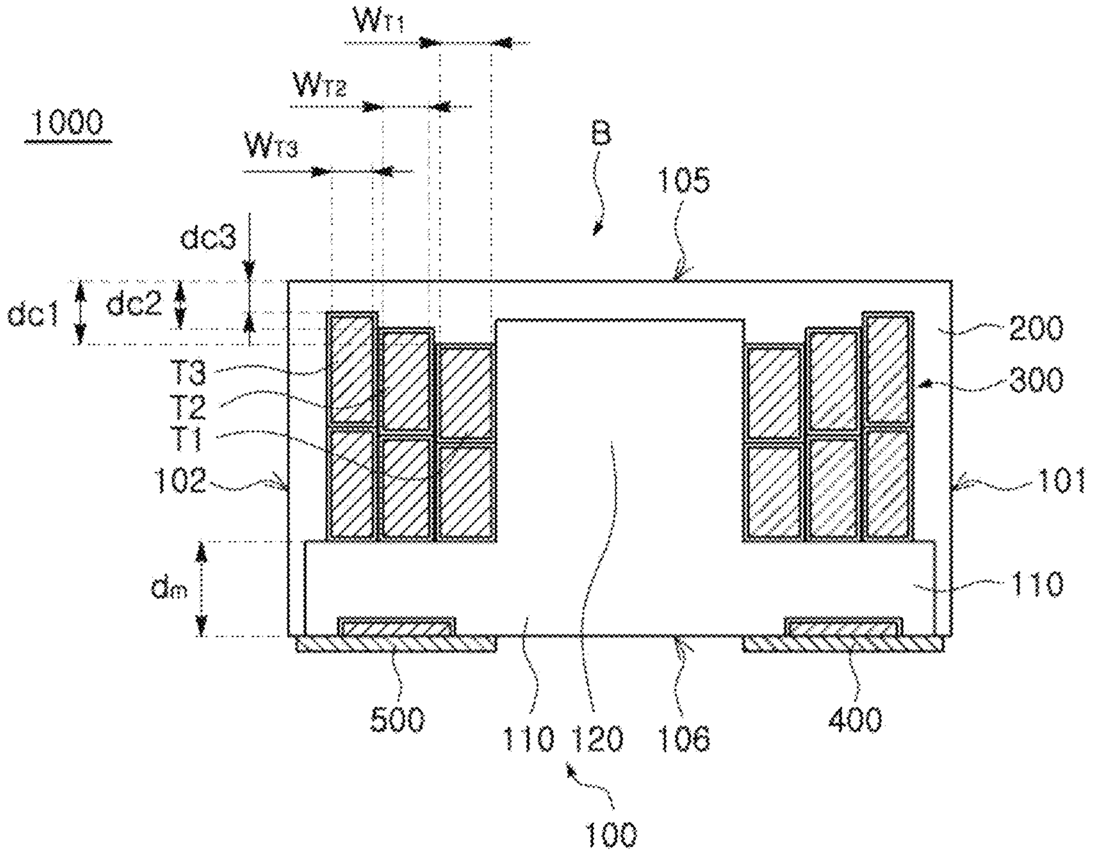
FIG. 4 is a cross-sectional view taken along line I-I' of FIG. 1.

FIG. 1 is a schematic view illustrating a coil component according to a first embodiment of the present disclosure. FIG. 2 is an exploded perspective view of the coil component of FIG. 1. FIG. 3 is a schematic view illustrating a modified embodiment of a molded portion. FIG. 4 is a cross-sectional view taken along line I-I' of FIG. 1. FIG. 2 illustrates only a molded portion 100, a wound coil 300, and a cover portion 200 for convenience of explanation. FIG. 4 illustrates that a portion of the intermediate turn of the wound coil 300 illustrated in FIG. 1 is omitted, and illustrates that differences in width and thickness between an innermost turn (T1) and an outermost turn (T3) are intended to illustrate for clarity of explanation. FIGS. 5 to 8 and 10 may show features similar to those of FIG. 4 described above in various other embodiments of coil components.

Referring to FIGS. 1 to 4, a coil component 1000 according to a first embodiment of the present disclosure may include a body B, a wound coil 300, and external electrodes 400 and 500. The body B may include a molded portion 100 and a cover portion 200. The molded portion 100 may include a support portion 110 and a core 120.

The body B may form an exterior of the coil component 1000 according to this embodiment, and the wound coil 300 may be embedded therein.

The body B may be formed to have a hexahedral shape overall.

Referring to FIGS. 1 and 2, the body B may include a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. Each of the first to fourth surfaces 101, 102, 103, and 104 of the body B may correspond to wall surfaces of the body B connecting the fifth surface 105 and the sixth surface 106 of the body B. Hereinafter, both opposing end surfaces of the body B may refer to the first surface 101 and the second surface 102 of the body B, and both opposing side surfaces of the body B may refer to the third surface 103 and the fourth surface 104 of the body B.

The body B may be formed such that the coil component 1000 according to this embodiment in which the external electrodes 400 and 500 to be described later are formed has a length of 2.0 mm, a width of 1.2 mm, and a thickness of 0.65 mm, but is not limited thereto.

The body B may include the molded portion 100 and the cover portion 200. The cover portion 200 may be disposed on the molded portion 100 as shown in FIG. 1 to surround the entire surfaces, except for a lower surface, of the molded portion 100. The first to fifth surfaces 101, 102, 103, 104, and 105 of the body B may be formed by the cover portion 200, and the sixth surface 106 of the body B may be formed by the molded portion 100 and the cover portion 200.

The molded portion 100 may have one surface and another surface opposing each other, and may include the support portion 110 and the core 120. The support portion 110 may support the wound coil 300. The core 120 may be disposed in a central portion of the one surface of the support portion 110 and may extend through a central hole of the wound coil 300. For the above reason, the one surface and the other surface of the molded portion 100 may be used in the same meaning as the one surface and the other surface of the support portion 110, respectively.

A thickness (dm) of the support portion 110 may be 200 μm or more. When the thickness (dm) of the support portion 110 is less than 200 μm, it may be difficult to ensure rigidity thereof. A thickness of the core 120 (e.g., measured in the thickness direction T) may be 150 μm or more, but is not limited thereto.

The cover portion 200 may cover the molded portion 100 and a wound coil 300 to be described later. The cover portion 200 may be disposed on the molded portion 100 and the wound coil 300, and may be then pressed to contact and be coupled to the molded portion 100.

At least one of the molded portion 100 and the cover portion 200 may include a magnetic material. In this embodiment, both the molded portion 100 and the cover portion 200 include a magnetic material. The molded portion 100 may be formed by filling the magnetic material into a mold for forming the molded portion 100. Alternatively, the molded portion 100 may be formed by filling a composite material containing a magnetic material and an insulating resin into the above-described mold. A molding process in which a high temperature and high pressure may be applied to the magnetic material or the composite material in the mold may be additionally performed, but is not limited thereto. The support portion 110 and the core 120 may be integrally formed together by a mold. The cover portion 200 may be formed by arranging the magnetic composite sheet on the molded portion 100 and the wound coil 300, and then heating and pressing the magnetic composite sheet.

The magnetic material may be a ferrite powder particle or a metal magnetic powder particle.

Examples of the ferrite powder particle may be at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The metal magnetic powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The metallic magnetic powder particle may be amorphous or crystalline. For example, the metal magnetic powder particle may be a Fe—Si—B—Cr-based amorphous alloy powder, but is not limited thereto.

The ferrite powder particle and the metal magnetic powder particle may have an average diameter of about 0.1 μm to 30 μm, respectively, but are not limited thereto.

Each of the molded portion 100 and the cover portion 200 may include two or more types of magnetic materials. In this case, the term "different types of magnetic materials" means that magnetic materials dispersed in an insulating resin are distinguished from each other by at least one of an average diameter, a composition, crystallinity, and a shape.

The insulating resin may include an epoxy, a polyimide, a liquid crystal polymer, or the like, in a single form or in combined forms, but is not limited thereto.

The wound coil 300 may be embedded in the body B to exhibit the characteristics of the coil component. For example, when the coil component 1000 of the present embodiment is used as a power inductor, the wound coil 300 may store an electric field as a magnetic field such that an output voltage may be maintained, thereby stabilizing power of an electronic device.

The wound coil 300 may be disposed on the one surface of the molded portion 100. Specifically, the wound coil 300 may be disposed on the one surface of the support portion 110, in a wound manner with respect to the core 120.

The wound coil 300 may be an air-core coil, and may be composed of a rectangular coil conductor or wire. The wound coil 300 may be formed by spirally winding a metal wire such as a copper (Cu) wire of which a surface is coated with an insulating material.

The wound coil 300 may be composed of a plurality of layers. Each layer of the wound coils 300 may be formed in a planar spiral shape, and may have a plurality of turns. For example, the wound coil 300 may form an innermost turn (T1), at least one intermediate turn (T2), and an outermost turn (T3), outward from the central portion of the one surface of the molded portion 100.

Referring to the magnetic flux distribution according to the position of each turn of the wound coil 300 in the body B, the magnetic flux may be more concentrated on the innermost turn (T1) adjacent to the core 120, than that of the outermost turn (T3) farthest from the core 120. Therefore, the present disclosure may be controlled to generate a difference in heights between the innermost turn (T1) and the outermost turn (T3) of the wound coil 300, to make a thickness (dc1) of the one region of the cover portion 200 disposed on the innermost turn (T1) to be thicker than a thickness (dc3) of the other region of the cover portion 200 disposed on the outermost turn (T3). A thickness (dc2) of a region of the cover portion 200 disposed on the intermediate turn (T2) may be thinner than the thickness (dc1) of the one region, and may be thicker than the thickness (dc3) of the other region.

In this configuration, the coil component 1000 according to this embodiment may increase a volume of the magnetic body in a region on which the magnetic flux is concentrated. As a result, the necking phenomenon may be prevented, and the deterioration of the component characteristics such as the inductance (Ls) may be prevented. In addition, since a thickness of the cover portion 200 is changed in accordance with the magnetic flux distribution in the component, it may be advantageous to reduce an overall thickness of the entire component.

The thickness of the innermost turn (T1) may be formed to be thinner than the thickness of the outermost turn (T3) to provide for the difference in heights between the innermost turn (T1) and the outermost turn (T3). In this case, the innermost turn (T1) and the outermost turn (T3) may each be formed of a single metal wire having the same cross-sectional area as each other, to prevent an increase in the inductance (Ls) and the DC resistance (Rdc). Therefore, in the case of this embodiment, a width ($W_{T1}$) of the innermost turn (T1) may be made wider than a width ($W_{T3}$) of the outermost turn (T3) through separate processing. As an example, the innermost turn (T1) may be modified in the winding process or in the process after the winding process. In the former case, after the innermost turn (T1) is wound, upper and lower portions of the innermost turn (T1) may be modified by being pressed, the intermediate turn (T2) may be wound, the intermediate turn (T2) may be modified by pressure, and then the outermost turn (T3) may be wound.

A distance between the one surface and the other surface of the molded portion 100, for example the thickness (dm) of the support portion 110 may be thicker than the thickness (dc1) of the one region of the cover 200. The thickness (dm) of the support portion 100 may be formed to be thicker than the cover portion 200, to support the wound coil 300 during the manufacturing process. In addition, since the thickness (dm) of the support portion 100 is relatively thicker than the cover portion 200, the necking phenomenon may not occur on a side of the lower portion of the core 120.

Both end portions of the wound coil 300 may be exposed from the other surface of the support portion 110, for example, the sixth surface 106 of the body B. Each of the end portions of the wound coil 300 exposed on the other surface of the support portion 110 may be connected, respectively, to the first and second external electrodes 400 and 500 arranged to be spaced apart from each other on the other surface of the support portion 110.

Both end portions of the wound coil 300 may be exposed from the other surface of the support portion 110. For example, as illustrated in FIG. 2, the support portion 110 may be formed with a receiving portion 111, having a pair of through-hole shapes, passing through the support portion 110, and each of the end portions of the wound coil 300 may be arranged in a respective through-hole of the receiving portion 111. Shape and formation position of the receiving portion 111, having the through-hole shapes, may be arbitrarily changed. As a non-limiting example, in a different manner to the embodiment illustrated in FIG. 2, the through-holes of the receiving portion 111 may be formed to have a circular or elliptical cross-sectional shape.

As another example, as illustrated in FIG. 3, the end portions of the wound coil 300 may be disposed along respective side surfaces of the support portion 110, and may be exposed from the other surface of the support portion 110. In this case, a receiving portion 111, having a groove shape, for receiving both end portions of the wound coil 300 may be formed on the respective side surfaces of the support portion 110, but is not limited thereto.

The first and second external electrodes 400 and 500 may be spaced apart from each other on the sixth surface 106 of the body B, for example, exposed on the other surface of the support portion 110, and may each be connected to a respective end portion of the wound coil 300.

The first and second external electrodes 400 and 500 may have a single-layer structure or a multilayer structure. For example, the first external electrode 400 may include a first layer comprising copper (Cu), a second layer disposed on the first layer and comprising nickel (Ni), and a third layer disposed on the second layer and comprising tin (Sn). The first and second external electrodes 400 and 500 may be formed by an electrolytic plating process, but the formation process is not limited thereto.

The first and second external electrodes 400 and 500 may be formed of a conductive material such as copper (Cu), aluminum (Al), silver (Ag), tin (Sn), gold (Au), nickel (Ni), lead (Pb), chromium (Cr), titanium (Ti), or alloys thereof, but the composition thereof is not limited thereto.

Although not illustrated in the drawings, the coil component 1000 according to this embodiment may further include an insulation layer disposed in a region, except for a region in which the external electrodes 400 and 500 are disposed in the sixth surface 106 of the body B. The insulation layer may be used as a plating resist in forming the external electrodes 400 and 500 by an electrolytic plating process, but is not limited thereto. The insulation layer may also be disposed on at least a portion of the first to fifth surfaces 101, 102, 103, 104, and 105 of the body B.

Second Embodiment

Figure 5:
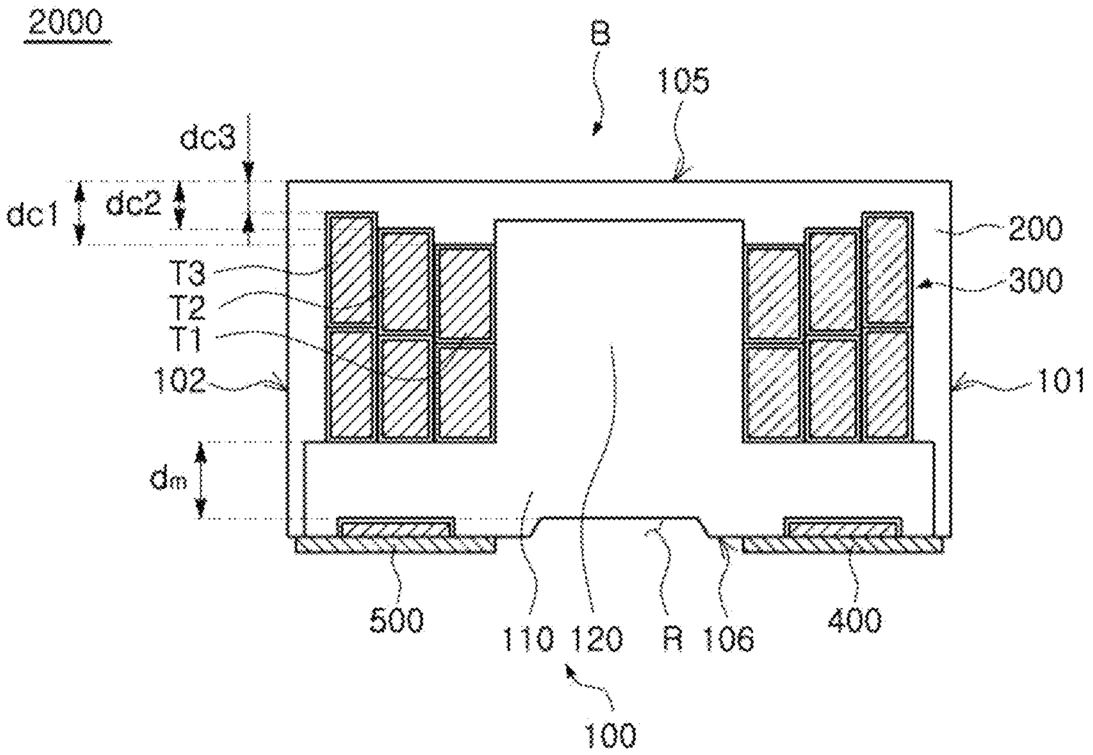
FIG. 5 is a schematic view illustrating a coil component according to a second embodiment of the present disclosure, corresponding to a cross-section taken along line I-I' of FIG. 1.

FIG. 5 is a schematic view illustrating a coil component according to a second embodiment of the present disclosure, corresponding to a cross-section taken along line I-I' of FIG. 1.

Referring to FIGS. 1 to 3 and 5, a coil component 2000 according to this embodiment may be different from the coil component 1000 according to the first embodiment of the present disclosure, in view of a molded portion 100. Therefore, in describing this embodiment, only the molded portion 100 different from the first embodiment will be described. The remaining configuration of this embodiment may be substantially similar to the first embodiment of the present disclosure.

In the second embodiment, a groove portion R may be formed on the other surface of a molded portion 100, for example, on the other surface of the support portion 110 between the first and second external electrodes.

The groove portion R may prevent unnecessary removal of the plating resist used for forming the first and second external electrodes 400 and 500 by electrolytic plating. For example, in order to form the external electrodes 400 and 500, a plating resist may be formed on the sixth surface 106 of the body B, including in an opening corresponding to a region used for forming the external electrodes. When the opening is formed by polishing or the like, a region other than the region for forming the external electrode may be removed, and the groove portion R may be for prevention thereof. For the reason described above, an insulating layer such as a plating resist, or the like, may be disposed in the groove portion R.

A minimum value of the distance from the one surface to the other surface of the support portion 110, for example, a minimum value of the thickness (dm) of the support portion 110 may be formed to be thicker than the thickness (dc1) of the one region of the cover portion 200, to prevent the occurrence of the necking phenomenon of magnetic flux on the side of the lower portion of the wound coil 300.

In this configuration, the coil component 2000 according to this embodiment may prevent plating blur or the like, when the external electrodes 400 and 500 are formed by an electrolytic plating process.

Third and Fourth Embodiments

Figure 6:
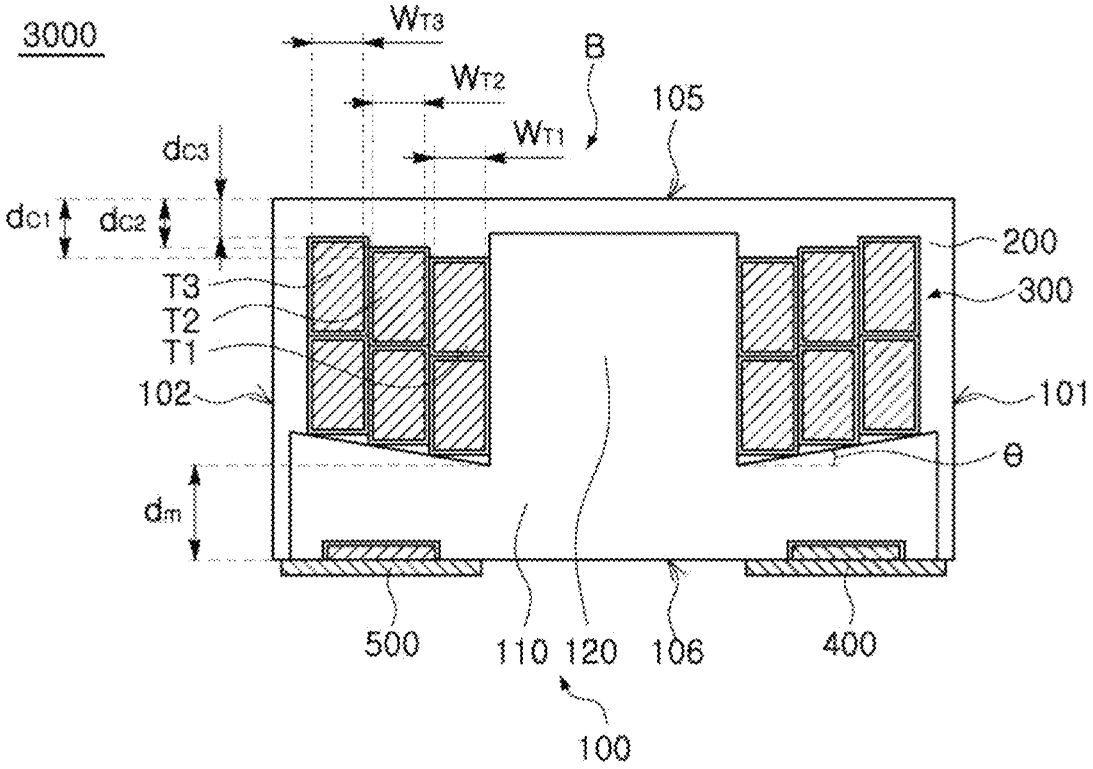
FIG. 6 is a schematic view illustrating a coil component according to a third embodiment of the present disclosure, corresponding to a cross-section taken along line I-I' of FIG. 1.
Figure 7:
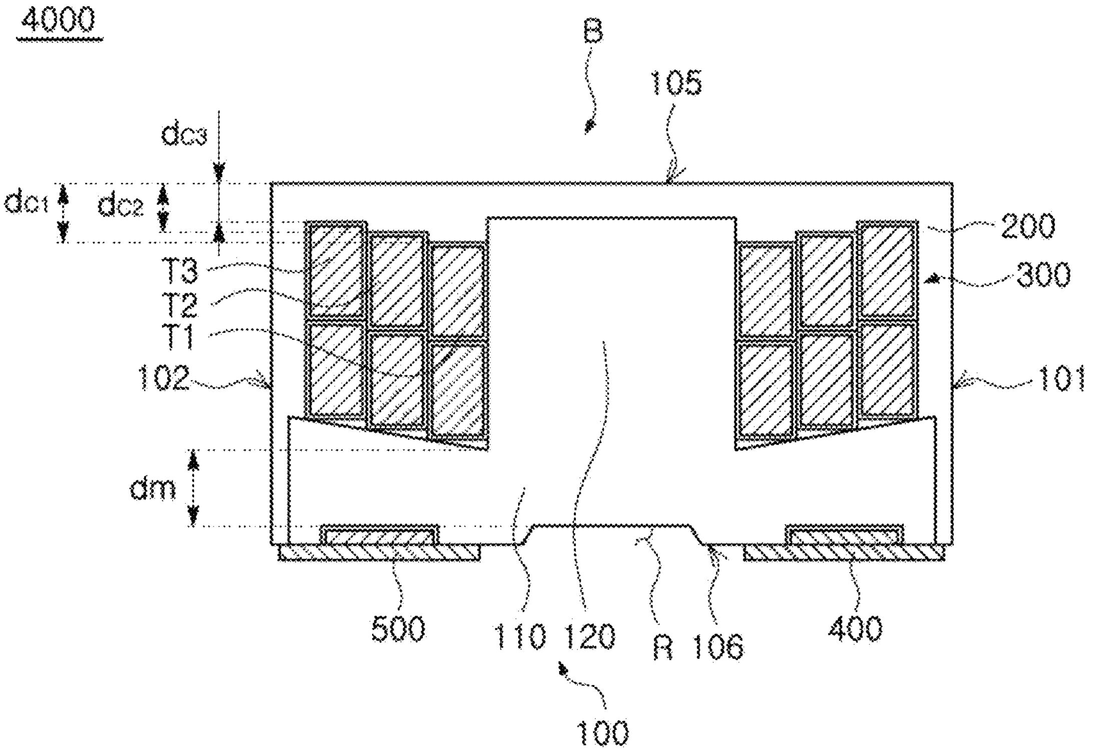
FIG. 7 is a schematic view illustrating a coil component according to a fourth embodiment of the present disclosure, corresponding to a cross-section taken along line I-I' of FIG. 1.

FIG. 6 is a schematic view illustrating a coil component according to a third embodiment of the present disclosure, corresponding to a cross-section taken along line I-I' of FIG. 1. FIG. 7 is a schematic view illustrating a coil component according to a fourth embodiment of the present disclosure, corresponding to a cross-section taken along line I-I' of FIG. 1.

Referring to FIGS. 1 to 3, 6, and 7, coil components 3000 and 4000 according to the third and fourth embodiments of the present disclosure may be different from the coil component 1000 according to the first embodiment of the present disclosure, in view of a molded portion 100 and a wound coil 300. Therefore, in describing these embodiments, only the molded portion 100 and the wound coil 300, which are different from the first embodiment, will be described. The remaining configuration of these embodiments may be substantially similar to the first embodiment of the present disclosure.

A wound coil 300 may be formed, such that widths ($W_{T1}$, $W_{T2}$, and $W_{T3}$) and thicknesses of each turns (T1, T2, and T3) are equal to each other. For example, widths ($W_{T1}$, $W_{T2}$, and $W_{T3}$) of an innermost turn (T1), an intermediate turn (T2), and an outermost turn (T3) may be equal to each other, and thicknesses of the innermost turn (T1), the intermediate turn (T2), and the outermost turn (T3) may be equal to each other. For example, in a manner different to the first embodiment of the present disclosure, the wound coil 300 applied to this embodiment may not be subjected to a separate deformation process for each turn. Thus, the total number of processes may be reduced.

In this embodiment, since the thicknesses of the turns (T1, T2, and T3) of the wound coil 300 are equal to each other, for a difference in thickness of the cover portion 200 on each turns (T1, T2, and T3), a shape of the molded portion 100 may be deformed. In particular, the one surface of the support portion 110 of the molded portion 100 may be formed as an inclined surface inclined toward the core 120. Therefore, the distance between one surface and the other surface of the support portion 110, for example, the thickness of the support portion 110 may gradually increase in a direction from the central portion of the support portion 110 externally towards an outer periphery of the one surface of the support portion 110.

The one surface of the support portion 110 may be sloped and non-parallel relative to the other surface, and may thus form a predetermined non-zero angle (0) in relation to the other surface with respect to a cross-section in the thickness T direction. The predetermined angle may be more than 3° and less than 30°. When the predetermined angle is 3° or less, a difference in magnetic flux density between the one region of the cover portion 200 (e.g., above the innermost turn T1) and the other region of the cover portion 200 (e.g., above the outermost turn T3) may be relatively small, and it may thus be difficult to expect a great effect in improving the characteristics of the component. When the predetermined angle exceeds 30°, a difference in heights between the innermost turn (T1) and the outermost turn (T3) may be excessively large, and the thickness of the entire component may increase, to be disadvantageous for thinning.

A minimum value of the distance from the one surface to the other surface of the support portion 110, for example, a minimum value of the thickness (dm) of the support portion 110 may be formed to be thicker than the thickness (dc1) of the one region of the cover portion 200, to prevent the occurrence of the necking phenomenon of magnetic flux on the side of the lower portion of the wound coil 300.

In this configuration, the coil component 3000 according to this embodiment may relatively easily prevent the necking phenomenon of the magnetic flux. For example, the shape of the molded portion 100 may be relatively easy to change, may be used with the mold to be changed, without changing the shape of the wound coil 300.

Referring to FIG. 7, a coil component 4000 according to the fourth embodiment may be formed with a groove portion R, as compared with the coil component 3000 according to the third embodiment. In the case of the groove portion R, since a similar groove portion R has been described in relation to the second embodiment of the present disclosure, a detailed description will be omitted.

Since the third and fourth embodiments have a main feature in that the one surface of the support portion 110 is formed as an inclined surface, in a different manner to the above-described embodiments, the wound coil 300 of the first and second embodiments in which widths and thicknesses of each of the turns (T1, T2, and T3) are different from each other may be applied to these embodiments.

Fifth and Sixth Embodiments

Figure 8:
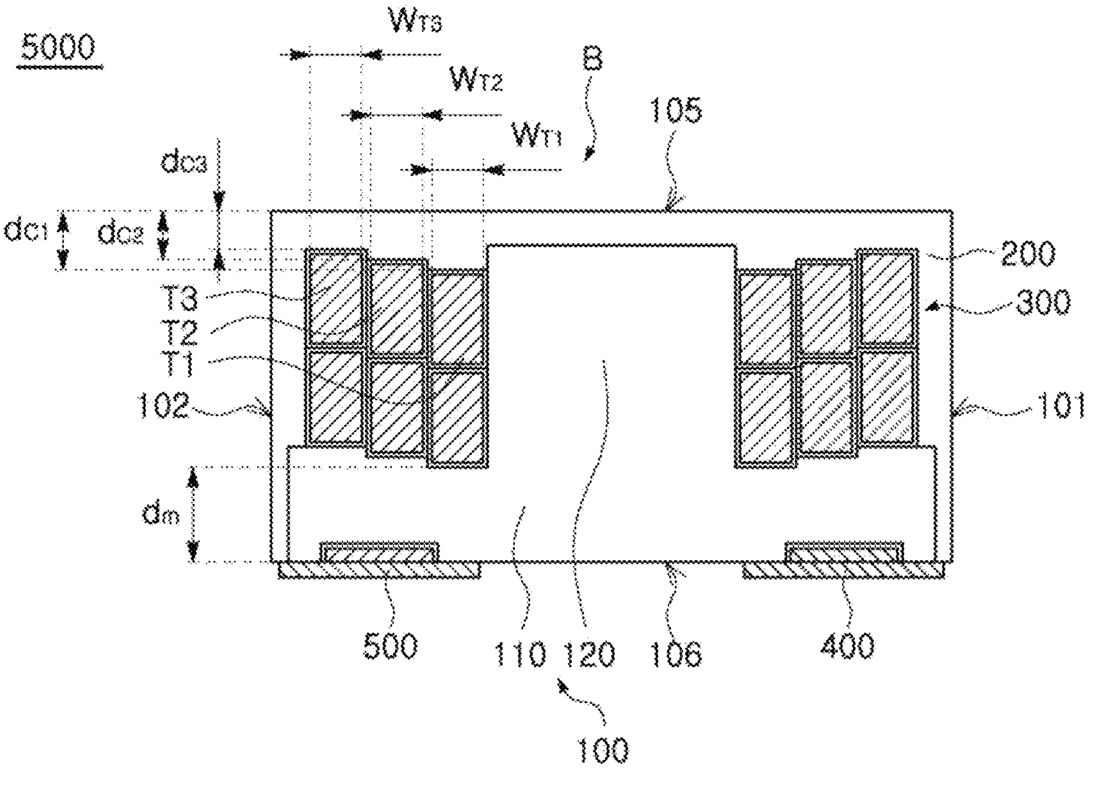
FIG. 8 is a schematic view illustrating a coil component according to a fifth embodiment of the present disclosure, corresponding to a cross-section taken along line I-I' of FIG. 1.
Figure 9:
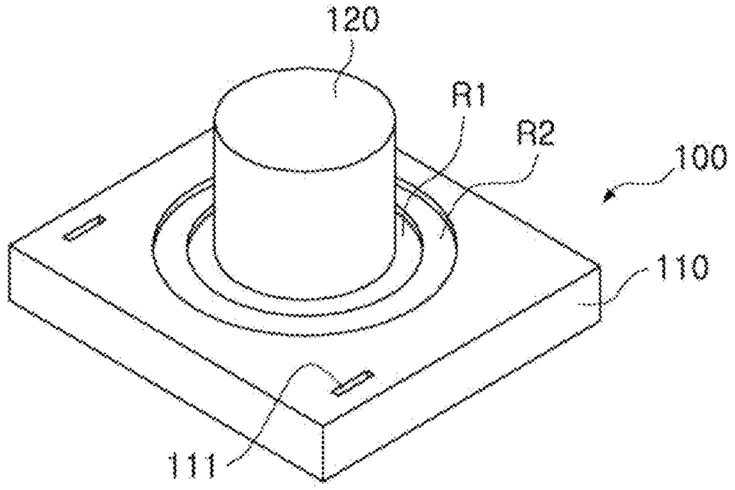
FIG. 9 is a perspective view schematically illustrating a molded portion applied to a coil component according to the fifth embodiment of the present disclosure.
Figure 10:
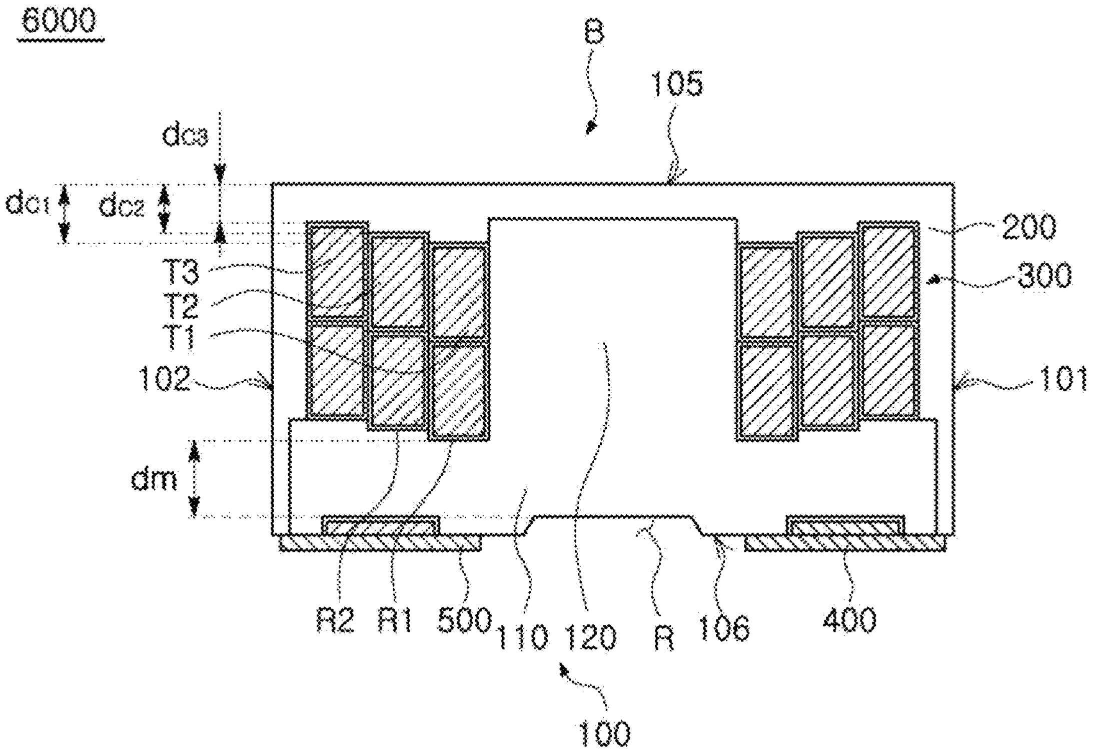
FIG. 10 is a schematic view illustrating a coil component according to a sixth embodiment of the present disclosure, corresponding to a cross-section taken along line I-I' of FIG. 1.

FIG. 8 is a schematic view illustrating a coil component according to a fifth embodiment of the present disclosure, corresponding to a cross-section taken along line I-I' of FIG. 1. FIG. 9 is a perspective view schematically illustrating a molded portion applied to a coil component according to the fifth embodiment of the present disclosure. FIG. 10 is a schematic view illustrating a coil component according to a sixth embodiment of the present disclosure, corresponding to a cross-section taken along line I-I' of FIG. 1.

Referring to FIGS. 1 to 3 and FIGS. 8 to 10, coil components 5000 and 6000 according to the fifth and sixth embodiments of the present disclosure may be different from the coil component 1000 according to the first embodiment of the present disclosure, in view of a molded portion 100 and a wound coil 300. Therefore, in describing these embodiments, only the molded portion 100 and the wound coil 300, which are different from the first embodiment, will be described. The remaining configuration of these embodiments may be substantially similar to the first embodiment of the present disclosure.

A wound coil 300 may be formed such that widths ($W_{T1}$, $W_{T2}$, and $W_{T3}$) and thicknesses of each turns (T1, T2, and T3) are equal to each other. For example, widths ($W_{T1}$, $W_{T2}$, and $W_{T3}$) of an innermost turn (T1), an intermediate turn (T2), and an outermost turn (T3) may be equal to each other, and thicknesses of the innermost turn (T1), the intermediate turn (T2), and the outermost turn (T3) may be equal to each other. For example, in a manner different to the first embodiment of the present disclosure, the wound coil 300 applied to this embodiment may be not subjected to a separate deformation process for each turn. Thus, the total number of processes may be reduced.

In this embodiment, since the thicknesses of the turns (T1, T2, and T3) of the wound coil 300 are equal to each other, for a difference in thickness of the cover portion 200 on each turns (T1, T2, and T3), a shape of the molded portion 100 may be deformed. In particular, receiving grooves (R1 and R2) respectively receiving the innermost turn (T1) and the intermediate turn (T2) may be formed on the one surface of the support portion 110 of the molded portion 100. A receiving groove (R2) receiving the intermediate turn (T2) may be formed at a predetermined depth from the one surface of the support portion 110, and a receiving groove (R1) receiving the innermost turn (T1) may be formed deeper than the receiving groove (R2). The receiving grooves (R1 and R2) may be formed in a ring shape corresponding to the shapes of the innermost turn (T1) and the intermediate turn (T2).

Due to the receiving grooves (R1 and R2), a difference in heights may be generated between the upper surface of the innermost turn (T1), the upper surface of the intermediate turn (T2), and the upper surface of the outermost turn (T3) with respect to the direction of FIG. 7, and the thickness (dc1) of the one region of the cover portion 200 disposed on the innermost turn (T1) may be formed to be thicker than the thickness (dc3) of the other region of the cover portion 200 disposed on the outermost turn (T3).

A minimum value of the distance from the one surface to the other surface of the support portion 110, for example, a minimum value of the thickness (dm) of the support portion 110 may be formed to be thicker than the thickness (dc1) of the one region of the cover portion 200, to prevent the occurrence of the necking phenomenon of magnetic flux at the side of the lower portion of the wound coil 300.

In this configuration, the coil component 5000 according to this embodiment may relatively easily prevent the necking phenomenon of the magnetic flux. For example, the shape of the molded portion 100 may be relatively easily changed through use of a modified mold, without changing the shape of the wound coil 300.

Referring to FIG. 10, a coil component 6000 according to the sixth embodiment has a groove portion R as compared with the coil component 5000 according to the fifth embodiment. Since the groove portion R has been described in the second embodiment of the present disclosure, a detailed description thereof will be omitted.

Since the fifth and sixth embodiments have a main feature in that the receiving grooves (R1 and R2) are formed on the one surface of the support portion 110, in a different manner to the above-described embodiments, the wound coil 300 of the first and second embodiments in which widths and thicknesses of each of the turns (T1, T2, and T3) are different from each other may be applied to these embodiments. In this case, the widths of the receiving grooves (R1 and R2) may be different from each other. For example, since the width ($W_{T1}$) of the innermost turn (T1) may be wider than the width of the intermediate turn (T2), the width of the receiving groove (R1) receiving the innermost turn (T1) may be wider than the width of the receiving groove (R2) receiving the intermediate turn (T2).

According to the present disclosure, it is possible to maintain the component characteristics while reducing the thickness of the coil component.

While example embodiments have been illustrated and described above, it will be apparent to those skilled in the art that modifications and variations could be made without departing from the scope of the present disclosure as defined by the appended claims.

What is claimed is:

1. A coil component comprising:

a body including a magnetic material and having one surface and another surface opposing each other in one direction;

a wound coil disposed in the body and including an innermost turn, at least one intermediate turn, and an outermost turn disposed outwardly of a central portion of the body; and first and second external electrodes connected to both ends of the wound coil and disposed on the one surface of the body, wherein a thickness of the body in the one direction in a region between the one surface and the intermediate turn is thicker than the thickness of the body in the one direction in a region between the one surface and the innermost turn, and the minimum thickness of the body in the one direction in the region between each turn of the wound coil and the one surface of the body is thicker than the thickness of the body in the one direction in the region between the innermost turn of the wound coil and the other surface of the body.

2. The coil component according to claim 1, wherein the thickness of the body in the one direction in the region between the one surface of the body and the outermost turn of the wound coil is thicker than the thickness of the body in the one direction in a region between the one surface of the body and the innermost turn of the wound coil.

3. The coil component according to claim 1, wherein the thickness of the body in the one direction in the region between the one surface of the body and the outermost turn of the wound coil is thicker than the thickness of the body in the one direction in the region between the one surface of the body and the intermediate turn of the wound coil.

4. The coil component according to claim 2, wherein the thickness of the body in the one direction in the region between the one surface of the body and the outermost turn of the wound coil is thicker than the thickness of the body in the one direction in the region between the one surface of the body and the intermediate turn of the wound coil.

5. The coil component according to claim 1, wherein the thickness of the body in the one direction in the region between each turn of the wound coil and the one surface of the body is thicker from the inside to the outside of the body.

6. The coil component according to claim 1, wherein the thickness of the body in the one direction in the region between the innermost turn of the wound coil and the one surface of the body is thinner than the thickness of the body in the one direction in the region between at least one of the remaining turns of the wound coil and the one surface of the body.

7. The coil component according to claim 1, wherein the thickness of the body in the one direction in the region between the innermost turn of the wound coil and the other surface of the body is thicker than the thickness of the body in the one direction in the region between at least one of the intermediate turns of the wound coil and the other surface of the body.

8. The coil component according to claim 1, wherein the innermost turn and at least one intermediate turn of the wound coil include two layers in one direction, and the interface between the two layers is closer to the other surface of the body from the inside to the outside of the body.

9. The coil component according to claim 1, wherein the magnetic material includes two or more types of materials that are distinguished from each other by at least one of an average diameter, a composition, crystallinity, and a shape.

10. The coil component according to claim 1, wherein the magnetic material includes ferrite.

11. The coil component according to claim 10, wherein the ferrite includes at least one of the groups consisting of Mg—Zn-based ferrite, Mn—Zn-based ferrite, Mn—Mg-based ferrite, Cu—Zn-based ferrite, Mg—Mn—Sr-based ferrite, Ni—Zn-based ferrite, Ba—Zn-based ferrite, Ba—Mg-based ferrite, Ba—Ni-based ferrite, Ba—Co-based ferrite, Ba—Ni—Co-based ferrite, Y-based ferrite, and the Li-based ferrites.

12. The coil component according to claim 1, wherein the magnetic material includes a metal magnetic powder.

13. The coil component according to claim 12, wherein the magnetic metal powder includes at least one of the groups consisting of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

14. The coil component according to claim 1, wherein the body includes a molded portion in which the wound coil is disposed, and a cover portion disposed on the molded portion to cover the wound coil and at least partially extend to a side surface of the molded portion.

15. The coil component according to claim 14, wherein the cover portion is in contact with the remaining region of the molded portion except for the region corresponding to the one surface of the body.

16. The coil component according to claim 14, wherein the molded portion includes a support portion for supporting a lower surface of the wound coil, and a core disposed at the center of the support portion and passing through the center of the wound coil.

17. The coil component according to claim 16, wherein the thickness of the core along the axial direction of the wound coil is 150 μm or more.

18. The coil component of claim 1, wherein a groove portion is disposed between the first and second external electrodes on the one surface of the body.

19. The coil component of claim 18, wherein a cross-sectional area of the groove portion in the cross-section perpendicular to the one direction decreases from the outside to the inside of the body.

* * * * *